United States Patent [19]

Pace et al.

[11] Patent Number: 4,982,141

[45] Date of Patent: Jan. 1, 1991

[54] DRIVER CIRCUIT FOR PIEZOELECTRIC TRANSDUCER AND ELECTROLUMINESCENT LAMP

[75] Inventors: Gary L. Pace, Boca Raton; Silvia M. Viteri, Lantana; David H. Overton, Boca Raton, all of Fla.

[73] Assignee: Motorola, Inc., Schaumburg, Ill.

[21] Appl. No.: 384,335

[22] Filed: Jul. 24, 1989

[51] Int. Cl.$^5$ .............................................. G09G 3/10
[52] U.S. Cl. .................................. 315/169.3; 315/246; 315/209 PZ; 340/569
[58] Field of Search ............... 315/169.3, 246, 209 PZ; 340/825.44, 825.45, 569

[56] References Cited

U.S. PATENT DOCUMENTS

| | | |
|---|---|---|
| 3,935,994 | 2/1976 | Darvishian .......................... 340/569 |
| 4,009,416 | 2/1977 | Lowther ............................. 315/246 |
| 4,254,362 | 3/1981 | Tulleners ......................... 315/169.3 |
| 4,319,164 | 3/1982 | Tulleners ......................... 315/169.3 |
| 4,527,096 | 7/1985 | Kindlemann ..................... 315/169.3 |
| 4,876,536 | 10/1989 | Matai et al. ........................ 340/825 |
| 4,899,086 | 2/1990 | Hirata ............................. 315/169.3 |

Primary Examiner—Eugene R. LaRoche
Assistant Examiner—Amir Zarabian
Attorney, Agent, or Firm—Daniel R. Collopy; Vincent B. Ingrassia; William E. Koch

[57] ABSTRACT

A driving circuit including a single transformer drives a piezoelectric transducer and an electroluminescent lamp. The circuit is coupled to the driving circuit for limiting the peak current through the transformer.

12 Claims, 1 Drawing Sheet

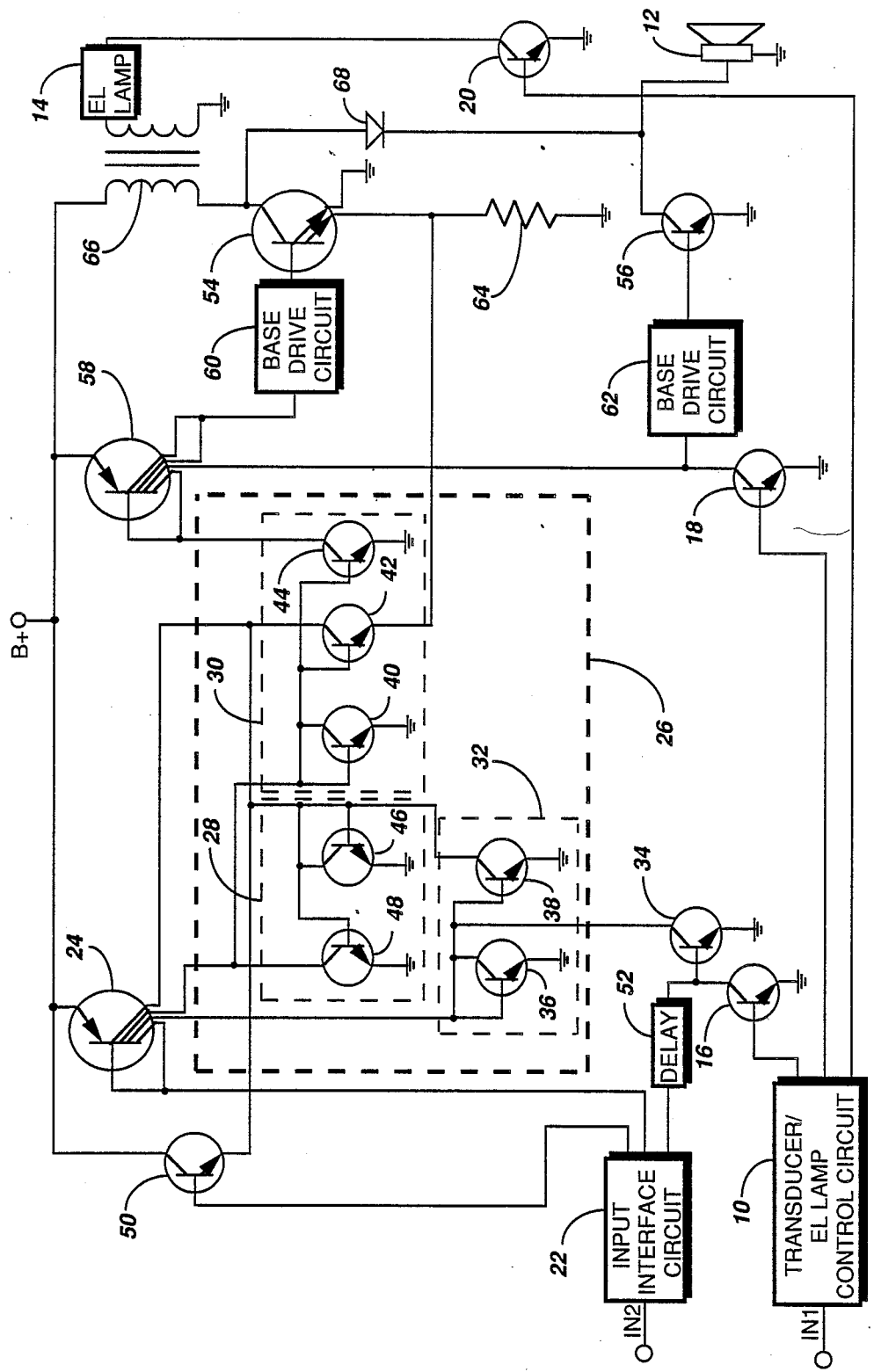

DRIVER CIRCUIT FOR PIEZOELECTRIC TRANSDUCER AND ELECTROLUMINESCENT LAMP

FIELD OF THE INVENTION

This invention relates in general to transducer driver circuits, and in particular to a combination piezoelectric transducer/electroluminescent lamp driver circuit.

BACKGROUND OF THE INVENTION

Many of the electronic articles on the market today utilize various devices for alerting the user of the article to a variety of conditions. In battery-operated selective call receivers, for example, the user is alerted to the receipt of a paging message by any of a number of sensory alerting devices. One such device is an aural alert resulting from activation of a transducer such as a piezoelectric transducer. During activation of the transducer, the inductor in the transducer driver circuit may saturate and the current drain of the driver circuit may become excessive with a resultant degradation in the battery life.

The driver circuit for a transducer normally includes an inductor coil or a transformer. In small electronic articles inductors and transformers are undesirable because they are large, costly and unreliable. In addition to alert devices, inductors or transformers are necessary for certain information display devices such as electroluminescent lamps used for backlighting liquid crystal displays. Some selective call receivers include both a transducer alert device and an electroluminescent panel backlight thereby requiring two inductors or an inductor and a transformer.

Thus, what is needed is a driver circuit for a transducer and an electroluminescent lamp which includes fewer than two transformers or inductors and contains circuitry to prevent inductor saturation.

SUMMARY OF THE INVENTION

Accordingly, it is an object of the present invention to provide a circuit for driving a transducer which preserves battery life.

It is a further object of the present invention to provide a transducer driver circuit which includes circuitry to limit the peak current through an inductor thereby preventing excessive driver circuit current drain.

It is also an object of the present invention to provide a transducer and an electroluminescent panel driver circuit which utilizes one transformer.

In carrying out the above and other objects of the invention in one form, there is provided a driver circuit for a transducer and an electroluminescent lamp utilizing a transformer, a diode and two transistors. The primary winding of the transformer is coupled on one side to a battery voltage supply terminal. On the other side, the primary winding is coupled to the collector of one of the transistors and the diode. The emitter of the transistor is coupled to a ground terminal. The collector of a second transistor and one side of the transducer are coupled to the other side of the diode with the other side of the transducer coupled to a ground terminal. The lamp is coupled between one side of the secondary winding of the transformer and a ground terminal. The other side of the secondary winding is coupled to the ground terminal. Circuitry for limiting the peak current through the primary winding of the transformer during transducer operation is coupled to the bases of the two transistors and to the emitter of the first transistor. Transistors coupled to the lamp and the transducer and responsive to an input signal operate to selectively activate the lamp and the transducer.

The above and other objects, features, and advantages of the present invention will be better understood from the following detailed description taken in conjunction with the accompanying drawing.

BRIEF DESCRIPTION OF THE DRAWING

The single figure is a schematic diagram of the present invention.

DETAILED DESCRIPTION OF THE INVENTION

Referring to the single figure, a transducer/EL lamp control circuit 10 selects which load, either a piezoelectric transducer 12 or an electroluminescent lamp 14, is to be driven depending on whether an input signal IN1 is low or high. The presence or absence of an input signal IN2 applied to the input interface circuit 22 determines whether any device is to be driven.

In the transducer drive mode, input IN1 is pulled low, causing the control circuit 10 to turn transistors 16, 18 and 20 off. With the transistor 20 turned off, electroluminescent lamp 14 is disconnected from ground and cannot be activated. Alternatively, the transistor 20 could be coupled between ground and the side of the secondary winding of transformer 66 opposite to the electroluminescent lamp 14 and in a like manner deactivate electroluminescent lamp 14. The input signal IN2, typically a square wave, is applied to the input interface circuit 22. The frequency of input signal IN2 is a function of the resonance of the drive device. In the transducer drive mode, a typical frequency for input signal IN2 would be 3200 Hertz. During the high interval of IN2, a current mirror transistor 24 receives an input current from input interface circuit 22 and provides three current source outputs to a bistable circuit 26 consisting of current mirrors 28, 30 and 32. At the beginning of the high level portion of IN2, the transistor 34 remains turned off and a current mirror 32 comprising transistors 36 and 38 is activated. The emitter area of the transistor 38 is greater than the emitter area of the transistor 36, typically twice the area. Since the output current of current mirror 32 exceeds the output current of current mirror transistor 24, transistors 46 and 48 comprising a current mirror 28 are turned off. This results in the bistable circuit 26 powering up in an ON state with a current mirror 30 comprising transistors 40, 42 and 44 conducting. Typically, the emitter areas of transistors 40 and 44 are equal with the emitter area of the transistor 42 substantially larger than the emitter areas of transistors 40 and 44, for example four times the area. The base of transistor 50 is biased by the input interface circuit 22 to a voltage, e.g. approximately 0.9 volts, to prevent collector-emitter voltage saturation in the transistor 42. After a delay, for example an approximately 10 $\mu$second delay, provided by a delay circuit 52, the transistor 34 is turned on, deactivating the current mirror 32. The delay circuit 32 ensures that switching transistors 54 and 56 are turned on following the leading edge of each high interval of input signal IN2. Switching transistors 54 and 56 are controlled by the bistable circuit 26 by taking the output current from the transistor 44 in the bistable circuit 26 and using the transistor 58 to apply current to base drive circuits 60 and 62 for transistors 54 and 56, respectively.

The current limiting is accomplished by the bistable circuit 26, the double emitter transistor 54 and a resistor 64. The peak current in the primary winding of a transformer 66 is determined by the ratio of the two emitter areas of the transistor 54, the value of the resistor 64, and the ratio of the emitter areas of transistors 40 and 42 in the bistable circuit 26. For example, the parameter values may be as follows:

| | |
|---|---|
| Ratio of the Transistor 54 Emitter Areas (Ratio of the Grounded Emitter to the Second Emitter) | 8:1 |
| Value of the Resistor 64 | 61Ω |
| Ratio of the Emitter Areas of Transistors 42 and 40 | 4:1 |

These values limit the peak current in the primary winding of the transformer 66 to approximately 20 milliamps. When transistors 54 and 56 are turned on, the current through the primary winding of the transformer 66 into the collector of the transistor 54 will begin to increase. The voltage across the resistor 64 will be a nonlinear representation of the transformer current if the beta of the transistor 54 is chosen to be sufficiently high and the base drive current of the transistor 54 is minimized. When the current through the transformer 66 reaches 20 milliamps, the voltage drop across the resistor 64 will be approximately 36 millivolts and the transistor 42 will be unable to sink the current supplied by the transistor 24. At this time the collector voltage of the transistor 42 will rise, turning on transistors 46 and 48, causing bistable circuit 26 to switch to the OFF state. Transistor 44 will be turned off resulting in switching transistors 54 and 56 being turned off. Thus, the peak transformer current has been effectively limited to a predetermined level by using current/voltage feedback to adjust the duty cycle of the signal applied to the bases of switching transistors 54 and 56. If the predetermined peak current level is not reached, the duty cycle of the switching transistor drive signal will be the same as the duty cycle of the input signal, IN2. The peak current limit should be set to a value which prevents saturation in the transformer 66 and which is within the current sinking capability of the transistor 54. This will result in minimum current drain and maximum battery life.

In the transducer drive mode, the transistor 20 is turned off and electroluminescent lamp 14 is disconnected from the secondary winding of the transformer 66. The inductance of the primary winding of the transformer 66 is used to control drive to piezoelectric transducer 12. At the beginning of the high interval of input signal, IN2, transistors 54 and 56 are turned on causing energy to be stored in the primary winding of the transformer 66 while simultaneously discharging the transducer 12 12 voltage. During the low interval of the input signal, transistors 54 and 56 are turned off causing the energy in the primary winding of the transformer 66 to be transferred to piezoelectric transducer 12. The transfer of energy to the piezoelectric transducer 12 occurs during the high interval of input signal IN2 if the peak transformer current exceeds the predetermined level.

The diode 68 isolates transducer 12 from primary winding of the transformer 66 so that the voltage on transducer 12 remains after the energy is transferred from the transformer 66. The voltage on the transducer 12 remains until the next high interval of the input signal when the transistor 56 turns on and discharges transducer 12 voltage.

During operation in the electroluminescent lamp drive mode, the input IN1 is pulled high, causing transistors 16, 18, and 20 to turn on. Turning the transistor 18 on turns off switching transistor 56 and isolates the piezoelectric transducer 12 from the transformer 66 following the first cycle of the input signal IN2. The frequency of input signal IN2 during electroluminescent drive mode is a function of the resonance of the electroluminescent lamp 14 and the secondary winding of transformer 66. When the transistor 16 is turned on, the transistor 34 is turned off, activating current mirror 32 and forcing bistable circuit 26 to remain in the ON state (switching transistors 54 and 56 remaining on) even if the transformer 66 peak current exceeds the predetermined level. This defeats the peak current limit circuit and provides for optimum drive to the electroluminescent lamp 14, which has been connected to the secondary winding of the transformer 66 by the transistor 20 turning on.

Though the preferred embodiment disclosed herein does not allow for the electroluminescent lamp 14 and the transducer 12 operating together, including another state for input signal IN1 and providing sufficient current to the transformer 66 to activate the electroluminescent lamp 14 and the transducer 12 simultaneously in response to signal IN1 being in the new state would allow such simultaneous operation.

In applications requiring only a piezoelectric transducer driver with low current drain, the benefits of the present invention can be realized by removing transistors 16, 18 and 20 and the transducer/EL lamp control circuit 10 from the circuit. Also, the transformer 14 can be replaced with an inductor.

By now it should be appreciated that there has been provided a driver circuit for a transducer and an electroluminescent lamp which includes only one transformer and contains circuitry to prevent the transformer saturation and switching transistor overload, thereby minimizing current drain.

We claim:

1. A circuit for driving a transducer and an electroluminescent device, said electroluminescent device having first and second electroluminescent device terminals, said circuit comprising:

a first supply voltage terminal;

a second supply voltage terminal;

an inductor coupled between said first supply voltage terminal and a first node, said inductor comprising a first coil of a transformer, said transformer having a second coil, said second coil coupled between said first electroluminescent device terminal and said second voltage supply terminal;

first means coupled between said first node and said second supply voltage terminal for draining current from said first node;

second means coupled between a second node and said second supply voltage terminal for draining current from said second node, said transducer coupled between said second node and said second supply voltage terminal;

third means responsive to a first input signal and said current drained from said first node for adjustably biasing said first and second means to reduce the current from said inductor; and fourth means coupled between said first node and said second node for isolating said transformer from said transducer;

fifth means coupled between said second electroluminescent device terminal and said second supply voltage terminal for enabling said electroluminescent device in response to a second input signal;

sixth means coupled between said second means and said second supply voltage terminal for disabling said second means in response to said second input signal; and seventh means coupled between said third means and said second supply voltage terminal for disabling said third means.

2. A circuit for driving a transducer and an electroluminescent device, said electroluminescent device having a first electroluminescent device terminal and a second electroluminescent device terminal, the circuit comprising:

a first supply voltage terminal;

a second supply voltage terminal coupled to said first electroluminescent device terminal;

an inductor coupled between said first supply voltage terminal and a first node, said inductor comprising a first coil of a transformer having a second coil, said second coil coupled between said second electroluminescent device terminal and a third node;

first means coupled between said first node and said second supply voltage terminal for draining current from said first node;

second means coupled between a second node and said second supply voltage terminal for draining current from said second node, said transducer coupled between said second node and said second supply voltage terminal;

third means responsive to a first input signal and said current drained from said first node for adjustably biasing said first and second means to reduce the current from said inductor; and fourth means coupled between said first node and said second node for isolating said transformer from said transducer;

fifth means coupled between said third node and said second supply voltage terminal for enabling said electroluminescent device in response to said second input signal;

sixth means coupled between said second means and said second supply voltage terminal for disabling said second means in response to a second input signal; and seventh means coupled between said third means and said second supply voltage terminal for disabling said third means.

3. A circuit for driving a transducer and an electroluminescent lamp, comprising:

a first supply voltage terminal;

a second supply voltage terminal;

a transformer having a first coil coupled between said first supply voltage terminal and a first node and a second coil having a first side coupled to said second supply voltage terminal; and first means coupled to said first and second supply voltage terminals and said first node for biasing said electroluminescent lamp and said transducer in response to a first input signal, said electroluminescent lamp coupled between a second side of said second coil and said means, said transducer coupled between said first means and said second supply voltage terminal.

4. The circuit of claim 3 wherein said transducer is a piezoelectric transducer.

5. The circuit of claim 3 wherein said first means comprises:

second means coupled between said first node and said second supply voltage terminal for draining current from said first node;

third means coupled between a second node and said second supply voltage terminal for draining current from said second node;

fourth means coupled between said first node and said second node for isolating said transformer from said transducer, said transducer coupled between said second node and said second supply voltage terminal;

fifth means responsive to said first input signal for adjustably biasing said second and third means to reduce the current from said inductor;

sixth means coupled between said third means and said second voltage supply terminal for enabling said third means in response to a second input signal; and seventh means coupled between said electroluminescent lamp and said second voltage supply terminal for enabling said electroluminescent lamp in response to said second input signal.

6. The circuit of claim 5 wherein said first input signal is a square wave signal.

7. The circuit of claim 6 wherein the frequency of said square wave signal is a function of the resonances associated with said transducer, said transformer and said electroluminescent lamp.

8. A circuit for driving a transducer and an electroluminescent lamp, comprising:

a first supply voltage terminal;

a second supply voltage terminal;

a transformer having a first coil coupled between said first supply voltage terminal and a first node and having a second coil, said electroluminescent lamp coupled between a first side of said second coil and said second supply voltage terminal; and first means coupled to said first and second supply voltage terminals, said second side of said second coil and said first node for biasing said electroluminescent lamp and said transducer in response to a first input signal, said transducer coupled between said first means and said second supply voltage terminal.

9. The circuit of claim 8 wherein said transducer is a piezoelectric transducer.

10. The circuit of claim 8 wherein said first means comprises:

second means coupled between said first node and said second supply voltage terminal for draining current from said first node;

third means coupled between a second node and said second supply voltage terminal for draining current from said second node;

fourth means coupled between said first node and said second node for isolating said transformer from said transducer, said transducer coupled between said second node and said second supply voltage terminal;

fifth means responsive to said first input signal and said current drained from said first node for adjustably biasing said second and third means to substantially reduce the current from said inductor;

sixth means coupled between said third means and said second voltage supply terminal for enabling said third means in response to a second input signal;

seventh means coupled between said second side of said second coil and said second voltage supply terminal for enabling said electroluminescent lamp in response to said second input signal; and eighth means coupled between said fifth means and said second supply voltage terminal for disabling said fifth means in response to said first and second input signals.

11. The circuit of claim 10 wherein said first input signal is a square wave signal.

12. The circuit of claim 11 wherein the frequency of said square wave signal is a function of the resonances associated with said transducer, said transformer and said electroluminescent lamp.

* * * * *